United States Patent
Lee et al.

(10) Patent No.: US 9,485,169 B2
(45) Date of Patent: Nov. 1, 2016

(54) SYSTEMS AND METHODS FOR ADAPTIVE ROUTING

(71) Applicant: Nexmo, Inc., San Francisco, CA (US)

(72) Inventors: Isabelle Lee, San Francisco, CA (US); Eric Nadalin, London (GB)

(73) Assignee: NEXMO INC., San Francisco, CA (US)

( * ) Notice: Subject to any disclaimer, the term of this patent is extended or adjusted under 35 U.S.C. 154(b) by 89 days.

(21) Appl. No.: 14/338,580

(22) Filed: Jul. 23, 2014

(65) Prior Publication Data

US 2016/0028615 A1    Jan. 28, 2016

(51) Int. Cl.
| | |
|---|---|
| H04L 12/707 | (2013.01) |
| H04L 12/26 | (2006.01) |
| H04L 29/08 | (2006.01) |
| H04L 12/721 | (2013.01) |
| H04L 12/703 | (2013.01) |
| H04L 12/803 | (2013.01) |

(52) U.S. Cl.
CPC ............ *H04L 45/22* (2013.01); *H04L 43/00* (2013.01); *H04L 45/123* (2013.01); *H04L 45/28* (2013.01); *H04L 47/122* (2013.01); *H04L 67/32* (2013.01)

(58) Field of Classification Search
CPC .... H04L 45/22; H04L 47/122; H04L 45/123
See application file for complete search history.

(56) References Cited

U.S. PATENT DOCUMENTS

| | | |
|---|---|---|
| 5,369,686 A | 11/1994 | Dutra et al. |
| 5,720,003 A | 2/1998 | Chiang et al. |
| 5,928,363 A | 7/1999 | Ruvolo |
| 8,738,051 B2 | 5/2014 | Nowack et al. |
| 9,237,492 B2 | 1/2016 | Wang et al. |
| 9,300,792 B2 | 3/2016 | Gonen et al. |
| 2008/0275785 A1 | 11/2008 | Altberg et al. |
| 2009/0111492 A1 | 4/2009 | Dudley et al. |
| 2011/0238766 A1* | 9/2011 | Lew ............... H04L 12/588 709/206 |
| 2012/0330856 A1 | 12/2012 | Hyder et al. |
| 2013/0036458 A1 | 2/2013 | Liberman et al. |
| 2014/0031070 A1* | 1/2014 | Nowack .......... H04L 29/06176 455/466 |
| 2014/0075525 A1 | 3/2014 | Ferlin |
| 2014/0364082 A1* | 12/2014 | Baddeley .......... H04W 40/02 455/406 |

FOREIGN PATENT DOCUMENTS

| | | |
|---|---|---|
| EP | 1289202 A1 | 3/2003 |
| WO | WO-03/063411 A1 | 7/2003 |

(Continued)

OTHER PUBLICATIONS

"Nexmo SMS Deliverability Guide," Oct. 21, 2012, Nexmo.*

(Continued)

*Primary Examiner* — Jae Y Lee
(74) *Attorney, Agent, or Firm* — Nixon & Vanderhye P.C.; Joseph Pagnotta

(57) ABSTRACT

Systems and methods for performing routing are described. For each of a plurality of messages transmitted over a primary route, a message transmission indication is received by an application. The application further receives, for at least one of the messages, a conversion indication that is based on the transmitted message. The quality of the primary route is determined based on a subset or all of the transmission indications and a subset or all of the conversion indications. Based on this determination, an alternate route is selected to replace the primary route.

26 Claims, 3 Drawing Sheets

(56) References Cited

FOREIGN PATENT DOCUMENTS

| WO | WO-2011/132181 A1 | 10/2011 |
|----|-------------------|---------|
| WO | WO-2012/006659 A1 | 1/2012  |

OTHER PUBLICATIONS

U.S. Appl. No. 14/816,892, filed Aug. 3, 2015, Systems and Methods for Adaptive Routing, Nadalin et al.

Int'l Search Report and Written Opinion of the ISA/EP in PCT/US2015/031535; Aug. 25, 2015; 10pgs.

U.S. Appl. No. 14/552,349, filed Nov. 24, 2014, Identity and Phone Number Verification, Soulez et al.

U.S. Appl. No. 62/137,592, filed Mar. 24, 2015, Multi-channel Communication System, Shirazi, et al.

U.S. Appl. No. 15/006,429, filed Jan. 26, 2016, Multi-channel Communication System, Shirazi, et al.

U.S. Appl. No. 14/816,892, filed Aug. 3, 2015, Systems and Methods for Adaptive Routing, Nadalin, et al.

* cited by examiner

SYSTEMS AND METHODS FOR ADAPTIVE ROUTING

BACKGROUND

The present disclosure relates generally to network communications and, more particularly, to systems and methods for performing routing based on conversion data and/or other network metrics.

Communications network pathways can experience congestion and the consequent slowing or failure of data delivery when the pathways become overloaded with traffic and, in some jurisdictions, are generally unreliable. In these circumstances, text messages and other data transfers over communications networks may arrive late or not reach their intended recipients at all, resulting in the loss of customers, end user complaints, increased cost of user acquisition, and financial detriment. Too often, unfortunately, the industry is driven by least-cost routing, rather than quality control, resulting in the persistence of these problems. Carriers, service providers, and end users alike would benefit from a network routing solution that addresses these shortcomings and provides an enhanced level of communications service for business-critical applications.

BRIEF SUMMARY

Systems and methods for routing are provided herein. In one aspect, a computer-implemented method comprises: receiving, for each of a plurality of messages, an indication of a transmission of the message wherein the transmission occurs over a primary route; receiving, for at least one of the messages, an indication of a conversion based on the message; determining a quality of the primary route based on at least a subset of the indications of transmission and at least a subset of the indications of conversion; and based on the determining, identifying whether an alternate route should replace the primary route. Other embodiments of this aspect include corresponding systems and computer programs.

In one implementation, a particular message comprises identity verification information. The identity verification information can comprise a personal identification number, a unique identifier, a registration code, or an activation code. A particular message can comprise a text message, a multimedia message, or a voice message. A particular conversion can comprise a verification of delivery of the message based on a response to the message.

In another implementation, the indications of transmission and indications of conversion are received over a first time period; and the subset of the indications of transmission and the subset of the indications of conversion are received over a second time period, wherein the second time period comprises a portion of the first time period. Determining the quality of the primary route can comprise: calculating a first ratio of conversions to message transmissions over the second time period based on the subset of the indications of transmission and the subset of the indications of conversion; and identifying whether a reduction in the quality of the primary route has occurred by comparing the first ratio to a second ratio of conversions to message transmissions over a third time period, wherein the third time period temporally precedes the second time period.

In a further implementation, determining the quality of the primary route comprises predicting whether a reduction in the quality of the primary route is likely to occur. The predicting can be based on a risk measure or on historical attributes associated with the primary route. The historical attributes can comprise at least one of a conversion ratio, a period of time, a date, a carrier, a geographical location, and a number of hops.

In yet another implementation, the method further comprises determining, for each of a plurality of alternate routes, a quality of the alternate route based on messages transmitted over the alternate route and conversions corresponding to the messages transmitted over the alternate route. Determining whether an alternate route should replace the primary route can comprise selecting one of the plurality of alternate routes based at least in part on the quality of the selected alternate route. The selection of the alternate route can be further based at least in part on a monetary factor. The method can further comprise redesignating the primary route as an alternate route.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings, in which.

DETAILED DESCRIPTION

In various implementations, systems and methods for routing based on conversion data and/or other network metric data are described herein. Routing or adaptive routing refers to the redirection and/or specification of one or more alternate pathways for traffic over a communications network in response to conditions or metrics (e.g., conversion data, predictions, bandwidth, latency, loss, jitter, etc.) associated with one or more pathways and/or traffic transmitted over the pathway(s). A pathway, or route, can include zero or more hops between a source and destination, and can include a connection to a carrier, such as a mobile network operator.

In one example, the majority of network traffic is directed over a primary route, and the remainder of the traffic is split among one or more alternate routes. Upon determining that the quality of the primary route has deteriorated by a certain amount, one of the alternate routes is selected to replace the primary. The quality of a particular route can be a measure of the reliability of the route over time, and can be determined based on route conditions or metrics such as conversion data and predictions.

As referred to herein, a "conversion" can be a successful verification of the delivery of a message based on a response to that message (e.g., an action taken by the recipient, a log-in, an activation, a registration, a confirmation sent to a routing controller, a verification based on a token, and so on). In one example, a conversion is an action taken by the message recipient to verify his identity based on information included in the transmitted message. In such an situation, the message information can include a personal identification number (PIN), registration code, activation code, password, pass phrase, or other unique identifier that can be used to associate or link a user or device with an account, a registration, a device, an application, and so on. In some implementations, a conversion represents a successful two-factor authentication process. For example, a user attempting to log into an online banking system can be sent a PIN code via a short messaging service (SMS) to the phone number associated with the account. The user must enter the PIN code to verify his identity (e.g., that he is associated with the mobile phone for the account), thereby adding an additional layer of identification to the login process. The validation of the user's identity through entry of the valid PIN code constitutes a conversion. In another example, a delivery receipt received from a carrier indicating that a message was successfully transmitted to a particular recipient is a conversion. In a further example, a conversion can be generated using a token, as described further below.

Figure 1:
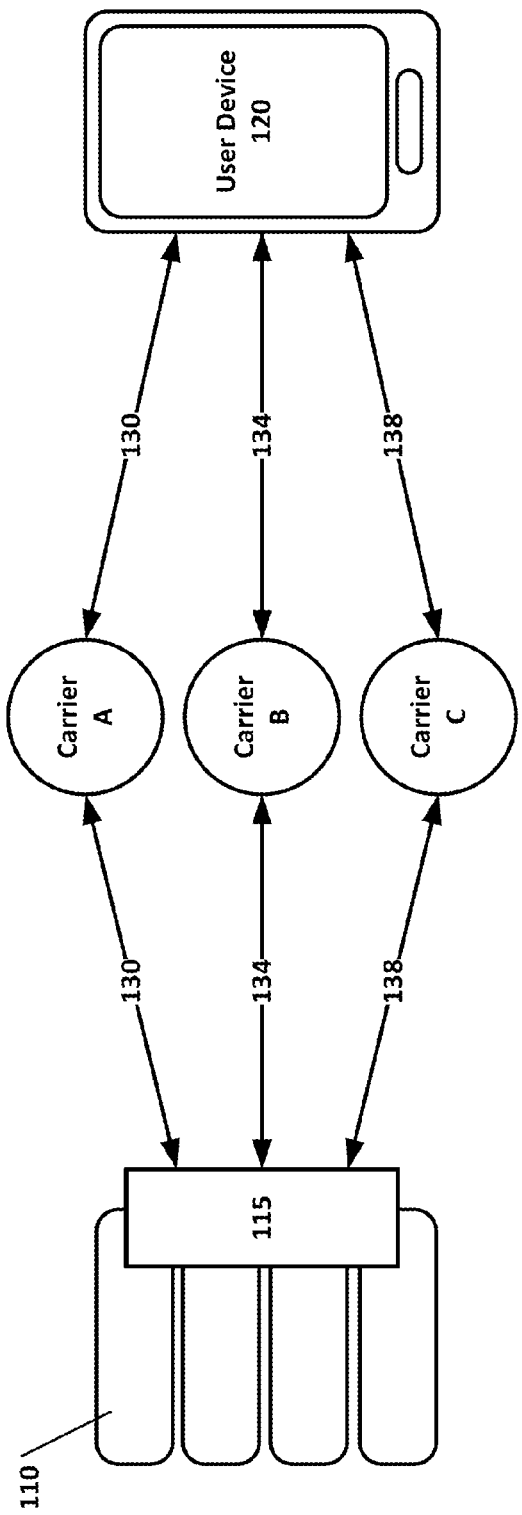
FIG. 1 is a diagram depicting an example high-level network architecture including a system for performing routing according to an implementation.

FIG. 1 illustrates a network architecture including one implementation of a system for performing routing. One or more servers 110 communicate with one or more user devices 120 over various routes (e.g., routes 130, 134 and 138) of a communications network. The server 110 can include an application 115 having an application programming interface (API) that facilitates sending and/or receiving information through one or more carriers (e.g., Carrier A, Carrier B, and Carrier C) over the respective routes 130, 134, and 138. The application 115 can be used to create and transmit messages including identity verification information (e.g., PIN, registration code, etc.) directed to a particular user device 120. The application 115 can also receive and process delivery receipts sent by carriers indicating that a particular message has been successfully received (or was unable to be received) by a user device 120. Further, the application 115 can receive and process notices indicating that conversions have occurred based on a previously transmitted message, as well as messages responding to originally sent messages.

In one implementation, the application 115 generates a unique token and includes it in a transmitted message to a recipient (along with, e.g., a PIN code or other verifying information). Upon receiving the message, the recipient can provide the message information (PIN code and unique token) to a requesting application, which relays the information to the server application 115 for validation. Upon determining the validity of the PIN code and token, the application 115 can generate a conversion corresponding to the originally transmitted message.

Various implementations of the system can use appropriate hardware or software; for example, the application 115 can execute on server class computers that have sufficient memory, data storage, and processing power and that run a server class operating system (e.g., Oracle® Solaris®, GNU/Linux®, and the Microsoft® Windows® family of operating systems) or other hardware capable of running an operating system such as the Microsoft Windows® operating systems, the Apple OS X® operating systems, the Apple iOS® platform, the Google Android™ platform, the Linux® operating system and other variants of UNIX® operating systems, and the like. The system can include a plurality of software processing modules stored in a memory and executed on a processor. By way of illustration, the program modules can be in the form of one or more suitable programming languages, which are converted to machine language or object code to allow the processor or processors to execute the instructions. The software can be in the form of a standalone application, implemented in a suitable programming language or framework.

The user devices 120 can include, but are not limited to, smart phones, smart watches, smart glasses, tablet computers, portable computers, televisions, gaming devices, music players, mobile telephones, laptops, palmtops, smart or dumb terminals, network computers, personal digital assistants, wireless devices, information appliances, workstations, minicomputers, mainframe computers, or other computing device that are operated as general purpose computers or a special purpose hardware devices that can execute the functionality described herein.

Communication between servers 110 and user devices 120 can take place over media such as standard telephone lines, LAN or WAN links (e.g., T1, T3, 56 kb, X.25), broadband connections (ISDN, Frame Relay, ATM), wireless links (802.11 (Wi-Fi), Bluetooth, ZigBee, Z-Wave, GSM, TD-CDMA, TD-SCDMA, CDMA, SMS over radio, fiber optics, etc.), for example. Other communication media are contemplated. The network can carry TCP/IP protocol communications, HTTP/HTTPS transmissions, and so on, and the connection between the user devices and servers can be communicated over such TCP/IP networks. Other communication protocols are contemplated.

Method steps of the techniques described herein can be performed by one or more programmable processors executing one or more computer programs to perform functions by operating on input data and generating output. Method steps can also be performed by, and the modules can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store instructions that, when executed by a processor, form the modules and other components described herein and perform the functionality associated with the components. The processor and the memory can be supplemented by, or incorporated in special purpose logic circuitry.

The system can also be practiced in distributed computing environments where tasks are performed by remote processing devices that are linked through a communications network. In a distributed computing environment, program modules can be located in both local and remote computer storage media including memory storage devices. Other types of system hardware and software than that described herein can also be used, depending on the capacity of the device and the amount of required data processing capability. The system can also be implemented on one or more virtual machines executing virtualized operating systems such as those mentioned above, and that operate on one or more computers having hardware such as that described herein.

It should also be noted that implementations of the systems and methods can be provided as one or more computer-readable programs embodied on or in one or more articles of manufacture. The program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 2:
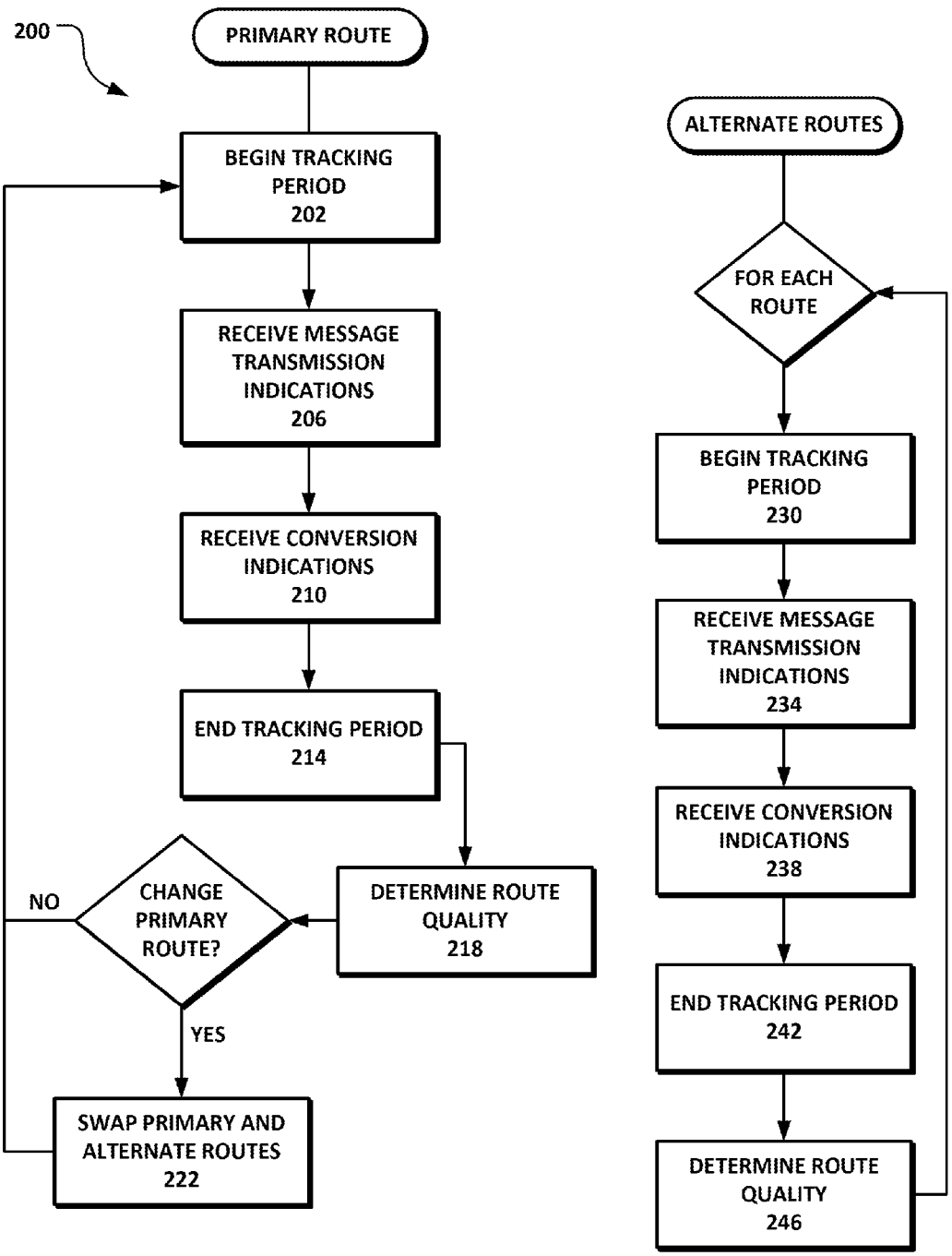
FIG. 2 is a flowchart depicting an example method for performing routing according to an implementation.

FIG. 2 depicts one implementation of a method 200 for performing routing. In STEP 202, the application 115 starts a tracking period for the primary network route. The tracking period is a window of time (e.g., 2 minutes, 3 minutes, 5 minutes, 7 minutes, 10 minutes, etc.) during which various data can be collected for determining route quality. The window of time can be sized based on, for example, a minimum data sample size required to obtain a reasonably accurate historical quality measurement. Routes over which a greater amount of measurable events occurs can require shorter windows than routes over which a smaller amount of such events occurs. For instance, a primary route carrying 80% of messages used to provoke conversions can have a 5-minute tracking period, whereas alternate routes which carry the remaining 20% can each have a 20-minute tracking period.

During the tracking period, traffic can be transmitted over the primary route (by or through, e.g., application 115 or another traffic source). The traffic can include text messages (e.g., SMS), multimedia messages (e.g., MMS), voice calls, and other forms of messages. In some instances, the foregoing types of traffic include identity verification information such as activation, confirmation, or registration codes, PINs, unique identifiers, or other identifying data. The application 115 can receive an indication for each transmission of a message over the primary route (STEP 206). The indications can be received from the message transmitter (e.g., the application 115) or other traffic source and can be, for example, indications that a particular message was sent and/or received during the tracking period.

Further, during the tracking period, network quality data associated with the primary route and/or traffic over the primary route (e.g., conversions, bandwidth, latency, loss, jitter, etc.) can be collected (STEP 210) and, in some instances, conversions can be generated and collected. In one implementation, the application 115 receives zero or more indications of conversion during the tracking period. The indications of conversion can be received directly or indirectly from servers that perform delivery tracking, authentication, or other verification processes, and can be based on previously transmitted messages. If, for example, during the tracking period, a user is sent a text message with a PIN code that can be used to authenticate the user on a banking website, and the user successfully logs into the website during the tracking period, an indication of such conversion can be received and tracked as route quality data. No conversion will occur, however, if the intended recipient never receives the transmitted message with the identity verification information. Further, if a conversion occurs after the tracking period, or the indication of conversion is received after the tracking period, no conversion is considered to have occurred for purposes of tracking the route quality. Moreover, indications of conversion received during the tracking period but that are based on messages transmitted prior to the tracking period can be ignored for purposes of route quality measurement as well.

In some implementations, only certain message transmissions and their consequent conversions are counted during a tracking period. For instance, the application 115 might track a subset of message transmissions based on the likelihood that the message recipient will, if he receives the message, take the necessary action to complete a conversion. As an example, consider a user that is attempting to create a new account on a financial website. In order to complete the registration (i.e., perform the conversion), the user must enter an activation code sent to his mobile phone via text message. This user has a higher likelihood of entering the code and successfully creating his account than a user who is provided a similar code for reading an online entertainment blog. The former user has a greater incentive to complete the conversion than the latter user, who may not find it worth the trouble. Accordingly, the application 115 can collect data relating only to certain uses (e.g., account registration, purchases, etc.) and/or message sources (e.g., banking websites, e-commerce websites, etc.) to ensure a more accurate reflection of the route quality. In other words, the conversion ratio for the route (conversions over messages transmitted) should reflect to the extent possible that conversion failures arose from failures in message transmission rather than users declining to complete conversions.

Figure 3:
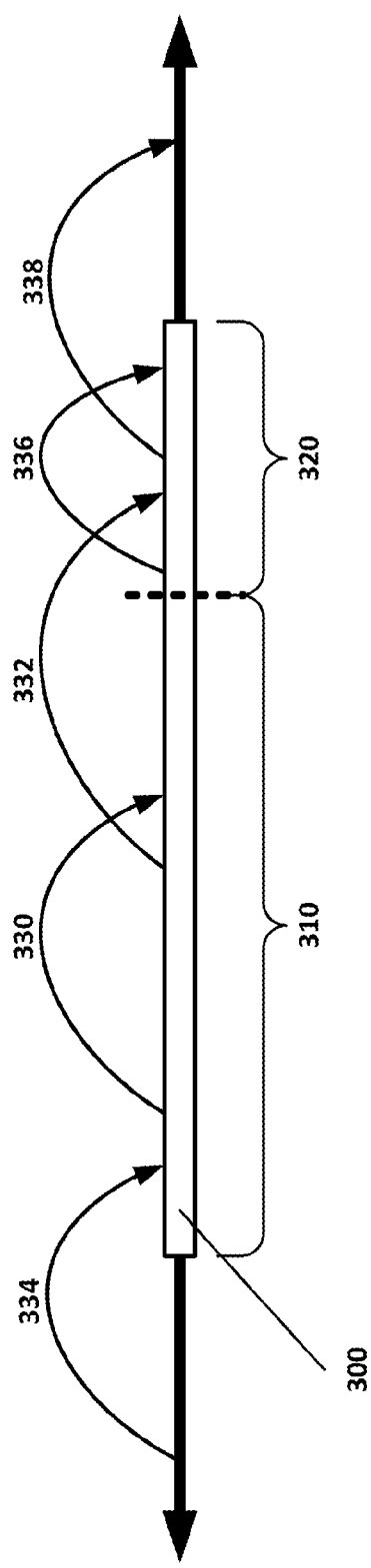
FIG. 3 is a diagram of a route quality tracking period according to an implementation.

In one implementation, the tracking period includes an end portion during which message transmissions are no longer tracked for purposes of determining route quality over that window of time, but conversions based on messages transmitted during the start portion are counted. This ensures that messages transmitted toward the latter part of the start portion have sufficient time to result in conversions. For example, as illustrated in FIG. 3, a tracking period 300 can be 7 minutes long, with a 5-minute start portion 310 and a 2-minute end portion 320. Indications of message transmissions and subsequent conversions received entirely within the start portion 310 (illustrated by arrow 330) are considered for a determination of route quality for tracking period 300, as are indications of conversion received during the end portion 320 that are based on messages transmitted during the start portion 310 (illustrated by arrow 332). On the other hand, in some implementations, one or more of the following are not used for calculating route quality for the tracking period 300: indications of conversion received during the tracking period 300 that are based on messages transmitted prior to the tracking period 300 (illustrated by arrow 334); indications of message transmissions received during the end portion 320, whether or not a respective indication of conversion is received within the end portion 320 (illustrated by arrows 336 and 338); and indications of conversion received after the tracking period 300, regardless of when the associated indication of message transmission was received (illustrated by arrow 338).

Referring again to FIG. 2, following the end of the tracking period (STEP 214), the application 115 determines the quality of the primary route based on data collected during the tracking period (STEP 218). In one implementation, the quality of the route is determined by calculating the ratio of received indications of conversion to received indications of message transmissions over the tracking period, and comparing the ratio to one or more similarly calculated ratios for previous tracking periods to identify whether a reduction in the conversion percentage (and thereby a decrease in the primary route quality) has occurred. For example, if during a first tracking period 100 messages are transmitted and 80 conversions occur, the calculated conversion ratio is 80/100, or 80%. During the next tracking period, 120 messages are transmitted and 48 conversions are received, resulting in a conversion ratio of 48/120, or 40%. Accordingly, over the two tracking periods, a reduction in route quality has occurred, namely, a decrease of 50% in the conversion ratio. Other methods of determining route quality are contemplated.

In STEP 222, based on the determination of route quality (over one or more tracking periods), an alternate route can be selected to replace the primary route (and, in some instances, the primary route can become an alternate route). The replacement primary route can be configured to accept the same or a different percentage of traffic as the former primary route (e.g., the traffic percentage can be increased from 80% to 85% if the new route has greater capacity). In determining whether the primary route should be replaced, consideration can be given to one or more of the following factors: whether there has been a decrease in route quality from the last tracking period that exceeds a particular threshold; whether there has been a decrease in route quality over a number of previous periods (e.g., average reduction over the periods, maximum or minimum reduction over the periods, reduction between the first and last period, etc.) that meets a particular threshold; whether the route quality has dropped below a minimum allowed quality; whether an alternate route is available; whether an alternate route having a minimum quality is available; whether an alternate route having a quality that exceeds the primary route quality by a threshold amount is available; and whether the primary route has already been replaced within a previous number of periods. As one example, if the quality of the primary route falls below 50% and/or the quality decreases by at least 5% from the previous tracking period, and an alternate route that has a better quality is available, the primary route and the best alternate route can be exchanged.

Other methods or factors instead of or in addition to route quality and the ratio calculation described above can be used to determine whether the primary route should be replaced and/or which alternate route to select. In some implementations, a decision whether to replace the primary route can be based at least in part on predictive methods, allowing the primary route to be preemptively exchanged before its quality decreases to an extent that would otherwise prompt a change (or not exchanged, if a predictive method indicates that the route quality will increase or remain stable). One such predictive method includes a measure of risk, such as a risk that the primary route quality will deteriorate more than a threshold amount over a period of time. There are various ways to measure risk, one of which is value at risk (VaR), used prominently in the financial field. For example, given a particular route, a probability and a time period, the VaR can be defined as a threshold value such that the probability that a decrease in route quality exceeds the threshold value is the given probability. Based on conversion data or other metrics, the VaR can be used to validate the need for a switch of routes otherwise identified using the route data/metrics. In some cases, the VaR can contradict the need for a switch identified by the data (based on, past trends, queuing, etc.) or can identify a better time to make the swap (e.g., wait a period of time before switching).

In one implementation, the determination of a likelihood that the primary route will need to be replaced is facilitated or automatically performed using machine learning, pattern recognition, data mining, statistical correlation, artificial neural networks, or other suitable known techniques. In one example, a classifier (e.g., a suitable algorithm that categorizes new observations) can be trained over time using various historical attributes associated with a route and/or route traffic, such as historical conversion ratios, quality, number of hops, carrier, a time or date associated with route traffic, geographical location (e.g., of a hop in the route), and other historical performance data (e.g., loss, delay, latency, available bandwidth, used bandwidth, jitter, etc.). The training data can be used by the classifier to learn whether a particular value of an attribute or combination thereof, at a point in time or over a period of time, reflects a likelihood that the primary route will be replaced. Attributes of a particular route can then be input to the classifier in order to obtain a prediction of whether the primary route quality is likely to decrease (and thus should be replaced). For example, if the classifier receives as input information indicating the current server time, the carrier location, and that the primary route quality has decreased 2% since the previous tracking period, the classifier might return as output a 75% likelihood that the route quality will further decrease over the next time period, necessitating a change in the primary route. This can occur if, for example, the classifier has learned, based on training data, that traffic sent around that time through that carrier has a high probability of deteriorating further in quality if a decrease in quality has previously occurred.

In one implementation, a monetary factor (e.g., cost, revenue, profit margin, etc.) can be considered instead of or in combination with route quality or other route or traffic attributes to determine which, if any, alternate route should be exchanged with the primary route. For example, an alternate route can be selected based at least in part on the profit margin associated with use of the route. In one case, the alternate route with the highest profit margin can be selected to replace the primary route. In another implementation, if a group of alternate routes have a route quality within a certain proximity (e.g., +/−1%, +/−5%, +/−10%, etc.), the alternate route in the group with the highest profit margin can be selected. In a further implementation, route quality and profit margin (and/or other factors) can be weighted (e.g., 75% quality, 25% margin) and combined to create a weighted rating for each alternate route, and the route with the highest weighted rating can be selected to replace the primary route. Other factors can be used in alternate route selection, such as available bandwidth, historical quality, whether the route is queuing, and so on.

Whether or not a change is made to the primary route, a new tracking period can begin following the end of the current tracking period. Alternatively, tracking periods can overlap. For example, if a tracking period has an end portion during which conversions are counted but message transmissions are not tracked for that period (see, e.g., FIG. 3 and accompanying text, above), a subsequent tracking period can commence at the start of the end portion, effectively overlapping the end portion. Thus, the subsequent tracking period can begin prior the end of the previous tracking period, and prior to a determination of route quality based on data collected during that previous period.

In some implementations, route quality data for one or more alternate routes is collected simultaneously with the tracking of quality data for the primary route, as described above. As shown in FIG. 2, the application 115 starts a tracking period for each observed alternate route (STEP 230). As with the primary route, the window of time for an alternate route tracking period can be sized based on, for example, a minimum data sample size required to obtain a reasonably accurate quality measurement. If fewer measurable events occur over in an alternate route over a certain period of time as compared to the primary route (e.g., because the alternate route has less traffic flowing through it), the alternate route tracking period can be longer in order to capture a sufficient number of events. Each alternate route can have a tracking period of the same length, or some or all alternate routes can have tracking periods of different lengths.

During the tracking period, traffic can be transmitted over an alternate route (by or through, e.g., application 115 or another traffic source). The traffic can include text messages (e.g., SMS), multimedia messages (e.g., MMS), voice calls, and other forms of messages. In some instances, the foregoing types of traffic include identity verification information such as activation, confirmation, or registration codes, PINs, unique identifiers, or other identifying data. The application 115 can receive an indication for each transmission of a message over the alternate route (STEP 234). The indications can be received from the message transmitter (e.g., the application 115) or other traffic source and can be, for example, indications that a particular message was sent and/or received during the tracking period.

Further, during the tracking period, network quality data associated with the alternate route and/or traffic over the alternate route (e.g., conversions, bandwidth, latency, loss, jitter, etc.) can be collected (STEP 238) and, in some instances, conversions can be generated and collected. In one implementation, the application 115 receives zero or more indications of conversion during the tracking period. The indications of conversion can be received directly or indirectly from servers that perform delivery tracking, authentication, or other verification processes, and can be based on previously transmitted messages. If, for example, during the tracking period, a user is sent a text message with a PIN code that can be used to authenticate the user on a banking website, and the user successfully logs into the website during the tracking period, an indication of such conversion can be received and tracked as route quality data. However, if the conversion occurs after the tracking period, or the indication of conversion is received after the tracking period, no conversion is considered to have occurred for purposes of tracking the route quality. Moreover, indications of conversion received during the tracking period but that are based on messages transmitted prior to the tracking period can be ignored for purposes of route quality measurement as well. The tracking period can include start and end portions as described with respect to the primary route and illustrated in FIG. 3.

Following the end of the tracking period (STEP 242), the application 115 determines the quality of the particular alternate route based on data collected during the tracking period (STEP 246). In one implementation, the quality of the route is determined by calculating the ratio of received indications of conversion to received indications of message transmissions over the tracking period, and comparing the ratio to one or more similarly calculated ratios for previous tracking periods to identify whether a reduction in the conversion percentage (and thereby a decrease in the alternate route quality) has occurred. For example, if during a first tracking period 100 messages are transmitted and 80 conversions occur, the calculated conversion ratio is 80/100, or 80%. During the next tracking period, 120 messages are transmitted and 48 conversions are received, resulting in a conversion ratio of 48/120, or 40%. Accordingly, over the two tracking periods, a reduction in route quality has occurred, namely, a decrease of 50% in the conversion ratio. Other methods of calculating route quality are contemplated. The application 115 can then use the quality data associated with the alternate routes in selecting a replacement primary route, if necessary.

Whether or not a change is made to the primary route, a new tracking period for an alternate route can begin following the end of the current tracking period. Alternatively, tracking periods can overlap. For example, if a tracking period has an end portion during which conversions are counted but message transmissions are not tracked for that period (see, e.g., FIG. 3 and accompanying text, above), a subsequent tracking period can commence at the start of the end portion, effectively overlapping the end portion. Thus, the subsequent tracking period can begin prior the end of the previous tracking period, and prior to a determination of route quality based on data collected during that previous period.

The terms and expressions employed herein are used as terms and expressions of description and not of limitation, and there is no intention, in the use of such terms and expressions, of excluding any equivalents of the features shown and described or portions thereof. In addition, having described certain implementations in the present disclosure, it will be apparent to those of ordinary skill in the art that other implementations incorporating the concepts disclosed herein can be used without departing from the spirit and scope of the invention. The features and functions of the various implementations can be arranged in various combinations and permutations, and all are considered to be within the scope of the disclosed invention. Accordingly, the described implementations are to be considered in all respects as illustrative and not restrictive. The configurations, materials, and dimensions described herein are also intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method comprising:
receiving, for each of a plurality of messages, an indication of a transmission of the message wherein the transmission occurs over a primary route;
receiving, for at least one of the messages, an indication of a conversion based on the message, wherein the indications of transmission and indications of conversion are received over a first time period;
determining a quality of the primary route based on at least a subset of the indications of transmission and at least a subset of the indications of conversion, wherein the subset of the indications of transmission and the subset of the indications of conversion are received over a second time period, wherein the second time period comprises a portion of the first time period,
wherein determining the quality of the primary route comprises:
calculating a first ratio of conversions to message transmissions over the second time period based on the subset of the indications of transmission and the subset of the indications of conversion; and identifying whether a reduction in the quality of the primary route has occurred by comparing the first ratio to a second ratio of conversions to message transmissions over a third time period, wherein the third time period temporally precedes the second time period; and based on the determining, identifying whether an alternate route should replace the primary route.

2. The method of claim 1, wherein a particular message comprises identity verification information.

3. The method of claim 2, wherein the identity verification information comprises a personal identification number, a unique identifier, a registration code, or an activation code.

4. The method of claim 1, wherein a particular message comprises a text message, a multimedia message, or a voice message.

5. The method of claim 1, wherein a particular conversion comprises a verification of delivery of the message based on a response to the message.

6. The method of claim 1, wherein determining the quality of the primary route comprises predicting a likelihood that the quality of the primary route will decrease.

7. The method of claim 6, wherein the predicting is based on a risk measure.

8. The method of claim 6, wherein the predicting is based on historical attributes associated with the primary route.

9. The method of claim 8, wherein the historical attributes comprise at least one of a conversion ratio, a period of time, a date, a carrier, a geographical location, and a number of hops.

10. The method of claim 1, further comprising determining, for each of a plurality of alternate routes, a quality of the alternate route based on messages transmitted over the alternate route and conversions corresponding to the messages transmitted over the alternate route.

11. The method of claim 10, wherein identifying whether an alternate route should replace the primary route comprises selecting one of the plurality of alternate routes based at least in part on the quality of the selected alternate route.

12. The method of claim 11, wherein the selection of the alternate route is further based at least in part on a monetary factor.

13. The method of claim 1, further comprising redesignating the primary route as an alternate route.

14. A system comprising:
one or more computers programmed to perform operations comprising:
receiving, for each of a plurality of messages, an indication of a transmission of the message wherein the transmission occurs over a primary route;
receiving, for at least one of the messages, an indication of a conversion based on the message, wherein the indications of transmission and indications of conversion are received over a first time period;
determining a quality of the primary route based on at least a subset of the indications of transmission and at least a subset of the indications of conversion, wherein the subset of the indications of transmission and the subset of the indications of conversion are received over a second time period, wherein the second time period comprises a portion of the first time period,
wherein determining the quality of the primary route comprises:
calculating a first ratio of conversions to message transmissions over the second time period based on the subset of the indications of transmission and the subset of the indications of conversion; and
identifying whether a reduction in the quality of the primary route has occurred by comparing the first ratio to a second ratio of conversions to message transmissions over a third time period, wherein the third time period temporally precedes the second time period; and
based on the determining, identifying whether an alternate route should replace the primary route.

15. The system of claim 14, wherein a particular message comprises identity verification information.

16. The system of claim 15, wherein the identity verification information comprises a personal identification number, a unique identifier, a registration code, or an activation code.

17. The system of claim 14, wherein a particular message comprises a text message, a multimedia message, or a voice message.

18. The system of claim 14, wherein a particular conversion comprises a verification of delivery of the message based on a response to the message.

19. The system of claim 14, wherein determining the quality of the primary route comprises predicting a likelihood that the quality of the primary route will decrease.

20. The system of claim 19, wherein the predicting is based on a risk measure.

21. The system of claim 19, wherein the predicting is based on historical attributes associated with the primary route.

22. The system of claim 21, wherein the historical attributes comprise at least one of a conversion ratio, a period of time, a date, a carrier, a geographical location, and a number of hops.

23. The system of claim 14, wherein the operations further comprise determining, for each of a plurality of alternate routes, a quality of the alternate route based on messages transmitted over the alternate route and conversions corresponding to the messages transmitted over the alternate route.

24. The system of claim 23, wherein identifying whether an alternate route should replace the primary route comprises selecting one of the plurality of alternate routes based at least in part on the quality of the selected alternate route.

25. The system of claim 24, wherein the selection of the alternate route is further based at least in part on a monetary factor.

26. The system of claim 14, wherein the operations further comprise redesignating the primary route as an alternate route.

* * * * *